United States Patent
Steinbusch

(10) Patent No.: US 6,910,207 B2
(45) Date of Patent: Jun. 21, 2005

(54) METHOD OF EXECUTING A COMPUTER PROGRAM WITH AN INTERPRETER, COMPUTER SYSTEM AND COMPUTER PROGRAM PRODUCT

(75) Inventor: Otto Lodewijk Steinbusch, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 750 days.

(21) Appl. No.: 09/811,637

(22) Filed: Mar. 19, 2001

(65) Prior Publication Data

US 2001/0052118 A1 Dec. 13, 2001

(30) Foreign Application Priority Data

Mar. 20, 2000 (EP) .............................. 00201007

(51) Int. Cl.[7] .................................. G06F 9/45
(52) U.S. Cl. ....................................... 717/153
(58) Field of Search ................... 717/115, 139, 717/140, 143, 147, 148, 152, 162, 153; 712/209, 228; 707/103 Y, 200, 103 R; 345/762

(56) References Cited

U.S. PATENT DOCUMENTS

| | | | |
|---|---|---|---|
| 5,367,685 A | | 11/1994 | Gosling ..................... 395/700 |
| 6,317,872 B1 | * | 11/2001 | Gee et al. ................... 717/152 |
| 6,382,846 B1 | * | 5/2002 | Lai et al. ..................... 712/209 |
| 6,446,084 B1 | * | 9/2002 | Shaylor et al. ............. 707/200 |
| 6,499,095 B1 | * | 12/2002 | Sexton et al. ............... 711/203 |
| 6,542,167 B1 | * | 4/2003 | Darlet et al. ................ 345/762 |

FOREIGN PATENT DOCUMENTS

EP        0009946 A1      4/1980

* cited by examiner

Primary Examiner—Todd Ingberg
Assistant Examiner—Tuan A Vu
(74) Attorney, Agent, or Firm—Michael J. Ure

(57) ABSTRACT

An interpreter uses a symbol table containing information for resolving symbolic references in instructions. Memory is provided for storing symbolic reference-result associations, the result of the association having resulted from resolving the symbolic reference of the association for an instruction. The memory is organized in groups of locations, each for results for a different category of instructions. During execution of a particular instruction, that group is consulted which is assigned to the category to which the particular instruction belongs. If that group contains an association for the symbolic reference in the particular instruction. If there is such an association, the result from the association is used as operand data for executing the particular instruction. If there is no such association, the particular symbolic reference is resolved by means of the symbol table. The result from said resolving is used as the operand data for executing the particular instruction and an association between the symbolic reference and the result of said resolving is stored in the group assigned to the category of the particular instruction.

9 Claims, 2 Drawing Sheets

METHOD OF EXECUTING A COMPUTER PROGRAM WITH AN INTERPRETER, COMPUTER SYSTEM AND COMPUTER PROGRAM PRODUCT

The invention relates to a method of executing a program with a computer system. The invention also relates to a computer system and a computer program product.

The Java computer language uses an execution model that involves a definition of a virtual machine and programs of instructions, also called byte codes, in a virtual machine language that is supported by the virtual machine. The Java program may be executed with a machine that can only execute instructions from its own instruction set, so-called native instructions, which are not identical to the virtual machine instructions. A typical implementation of the virtual machine involves an interpreter, which is implemented for example as a program running on a computer system. The interpreter reads the virtual machine instructions. The interpreter selects native instructions that implement these virtual machine instructions and finally the interpreter causes the execution of these native instructions In the Java language a virtual machine instruction may contain a symbolic reference. Such a symbolic reference refers to the name (or type or structure etc.) of an operand, rather than to the actual value. In case of the Java language, a symbolic reference refers to an object in a so-called "constant pool". The object in turn may refer to other objects and so on. When the interpreter executes an instruction with a symbolic reference, this symbolic reference is first "resolved": the references are followed and translated until a result is produced that can be used as a practical input for the execution by the interpreter. If necessary, as part of resolving a reference, objects such as variables or classes that are referred to are loaded or prepared in another way (e.g. initialized) to realize a practical operand. Furthermore, a search is made for definitions of classes, operand size is determined, access privilege is checked etc. During the execution of a later virtual machine instruction in the program, the same symbolic reference may again be encountered. In principle, this means that part or all the work for the symbolic reference will be executed again. This work takes a considerable part of execution time.

From U.S. Pat. No. 5,367,685 it is known to modify a virtual machine instruction at run-time after resolution by storing the practical result of resolution in the virtual machine instruction as a replacement of the symbolic reference. Usually the virtual machine instruction itself is replaced, to account for the altered type of operand. Thus, it won't be necessary to resolve the symbolic reference more than once if the same virtual machine instruction (from the same place in the program) is executed again. This does not exclude a need for repeated resolution if other instructions at different locations in the program contain the same symbolic reference.

It is an object of the invention to reduce the amount of time needed for resolving symbolic references during execution of instructions that contain such symbolic references.

According to the invention, groups of memory locations are provided, each supporting a storage function for storing a result of resolving a symbolic references. Different groups of memory locations are provided for different categories of instruction types (a category may consist of only one type of instruction; different instructions of the same type have the same op-code for example). When an instruction of a particular category with a symbolic reference is encountered, only the group of memory locations for that particular category is consulted to determine whether a result of resolving the symbolic reference has been stored. If it is not stored, the symbolic reference is resolved and the result is stored in the group of memory locations provided for the particular category. In case of the Java language for example, different instruction categories are distinguished for "get_field", "invoke_method" and "new" virtual machine instructions etc. In principle instructions in the same category differ only in the operands they refer to and concern the same operation, but it is also envisaged that instructions that concern different but related operation may belong to the same category.

The use of memory locations for storing the results of resolution in combination with the symbolic reference involved speeds up execution even if a single memory is used for all types of instruction. The speed is improved further by using different specialized groups of memory locations for symbolic references in different categories of instructions. This has the advantage that the number of symbolic references per group is smaller than the overall number of symbolic references. This reduces the time needed to determine whether a symbolic reference is present in the memory locations, at little or no additional cost because the type of operation of the instruction (from which the category follows) has to be determined anyway during interpretation. Of course, this implies that, if the same symbolic reference were to be used in instructions of different categories, the symbolic reference may have to be resolved repeatedly, once for each category. However, it has been found that this loss is small or non-existent because the same reference is normally used only in only one or a very limited number of categories.

Moreover, the result of resolution can be specialized for the category of instruction. If different practical results of resolution of the same symbolic reference are needed for instructions of different categories, the practical result needed for instructions of that category may be stored. If no distinction per category was made, one could only store a less resolved result that could serve as a basis for resolving the practical category for all categories of instructions.

These and other advantageous aspects of the method and computer system according to the invention will be described in more detail using of the following figures.

Figure 1:
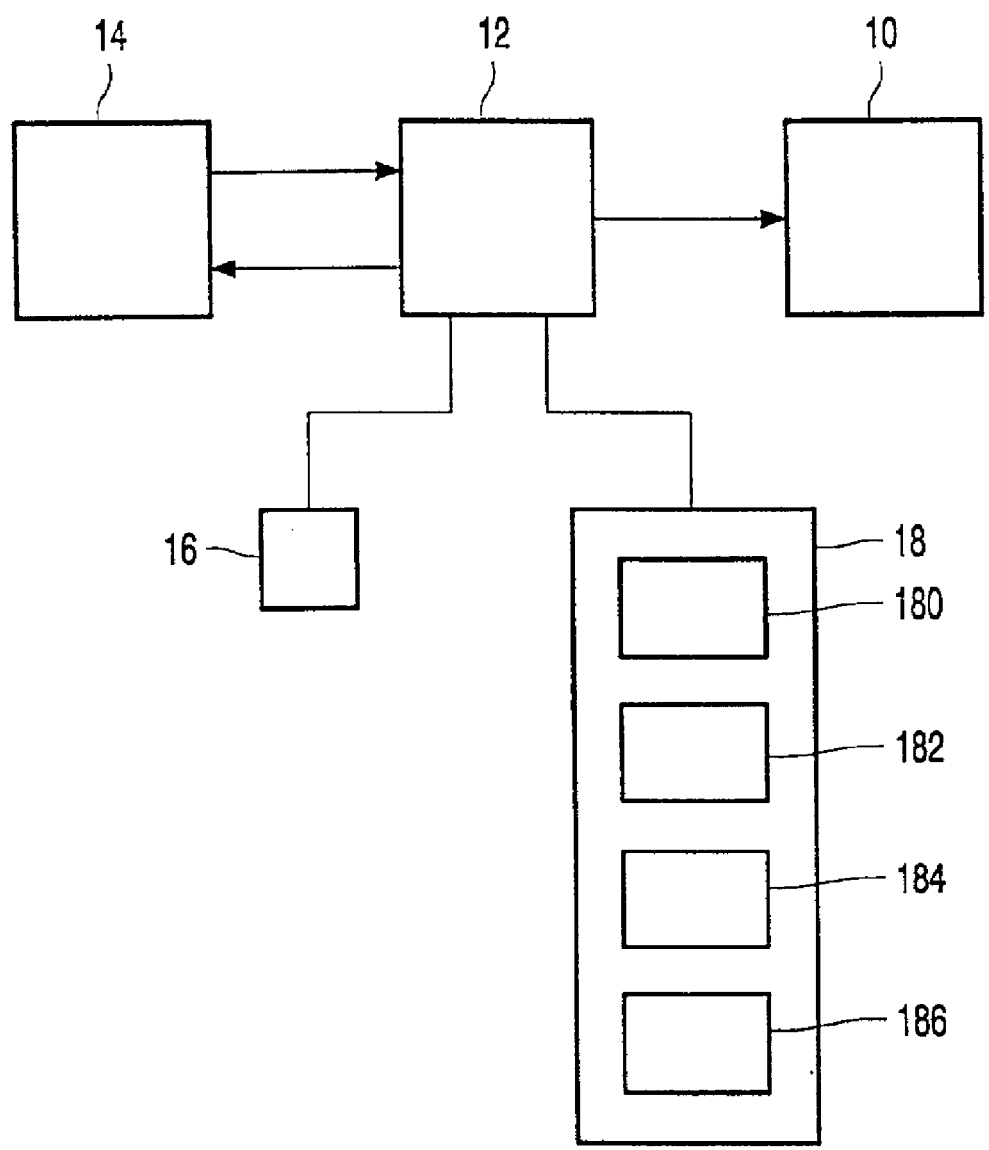
FIG. 1 shows a computer architecture.

FIG. 1 shows a computer architecture comprising a processor 10, an interpreter 12, an instruction memory 14, a data memory 16 and a resolution result memory 18. The resolution result memory 18 is structured into sub-memories 180, 182, 184, 186. The interpreter is coupled to processor 10, instruction memory 14, data memory 16 and resolution result memory 18. It is to be noted that FIG. 1 shows an architecture rather than any specific circuit. This means that the individual component shown can be implemented in various ways. One way of implementing the components is to use different circuits for the processor 10, instruction memory 14, data memory 16 and sub-memories 180, 182, 184, 186 of resolution result memory 18. However, the implementation of functions of the components may be combined into shared units. For example, different memory regions of a common memory may be used for instruction memory 14, data memory 16 and the sub-memories 180, 182, 184, 186 of resolution result memory 18. These regions need not be continuous regions: memory locations for instruction memory 14, data memory 16 and the sub-memories 180, 182, 184, 186 of resolution result memory 18 may be interleaved in any way if necessary. As another example, interpreter 12 may be implemented as a program stored in a memory and run on processor 10 or the interpreter may be a preprocessor that translates instructions for processor 10. As a further example, processor 10 and interpreter 12 may be part of a single processor capable of executing virtual machine instructions directly, i.e. without translation into native machine instructions. In this case native instructions and machine instructions are synonymous. As another example, any combination of such implementations may be used.

By way of illustration the operation of the computer architecture will be described in terms of interpretation of a program of JAVA virtual machine instructions, although the invention is not limited to JAVA programs. Each JAVA virtual machine instruction (also called byte code) identifies an operation to be performed. Certain JAVA virtual machine instructions also define an operand for use in the operation, the operand being defined as an explicit number or by means of a reference to the so-called "constant pool", which is a data structure stored in data memory 16 during execution of the JAVA program. Examples of JAVA virtual machine instructions that contain a reference to the constant pool are the instructions called anewarray, checkcast, getfield, getstatic, instanceof, invokeinterface, invokespecial, invokestatic, invokevirtual, ldc, ldc_w, ldc2_w multianewarray, new, putfield, putstatic. The reference to the constant pool refers for example to an item in the constant pool which in turn refers to a class name. As another example the reference may refer to an item that in turn contains a first and second reference, the first reference referring to another item that defines a class name, the second reference referring to another item that defines a field name.

Interpretation of such a virtual machine instruction involves "resolution" of the reference. In case of the "getfield" virtual machine instruction the reference to the constant pool ultimately has to be converted into an address for addressing memory locations that store the content of a field of a class. To realize this, resolution involves looking up the class involved and the location of the field in the class.

In case of the "new" instruction, the reference to the constant pool has to be converted to an address of a description of an object that is to be created.

Figure 2:
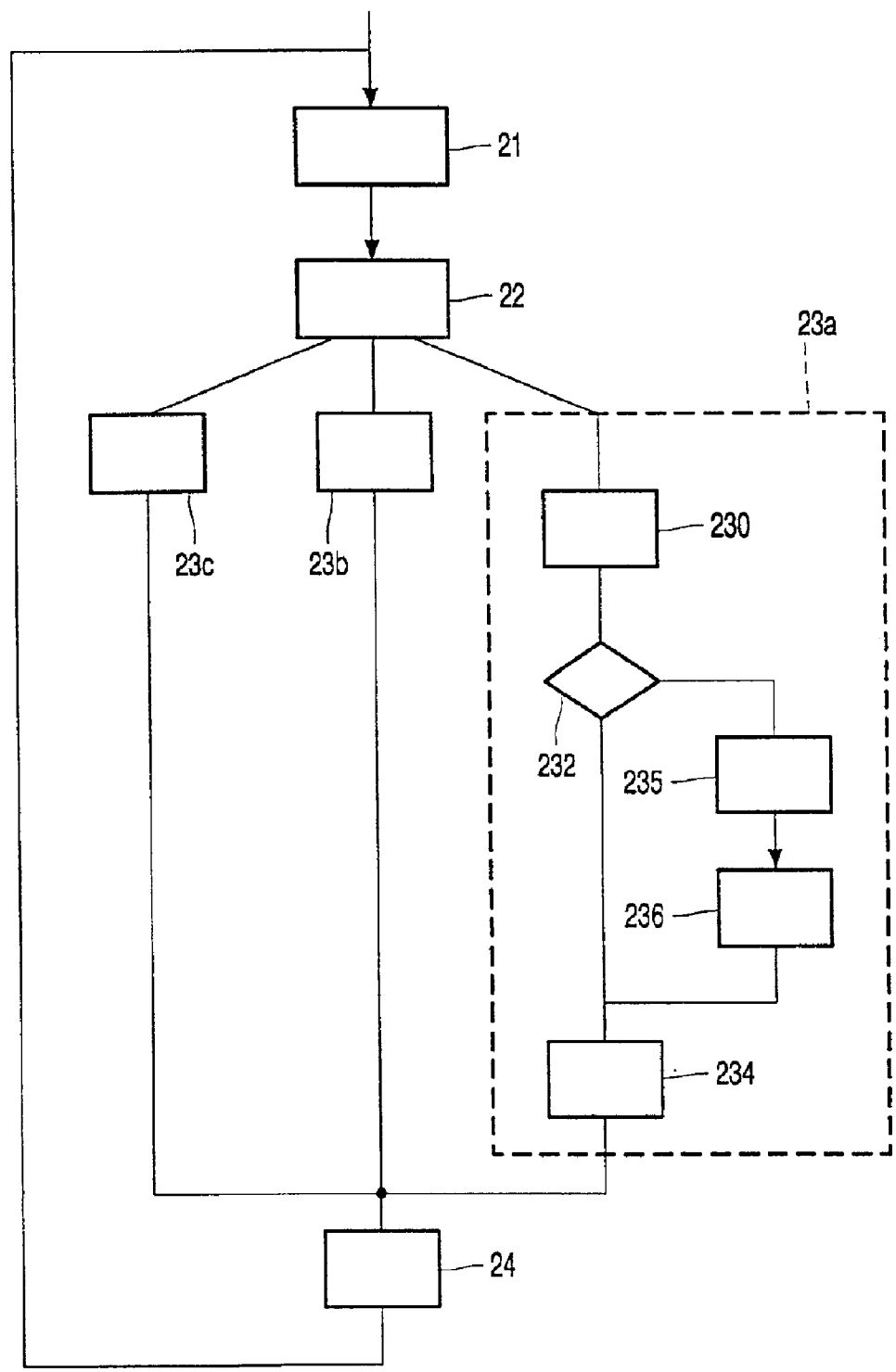
FIG. 2 shows a flow-chart for executing a program.

FIG. 2 shows a flow-chart illustrating the operation of the computer architecture of FIG. 1. In a first step 21 interpreter 12 loads a virtual machine instruction from instruction memory 14. In a second step 22, interpreter 12 determines the category type of the virtual machine instruction. The second step 22 selects, dependent on the type of instruction (or the category to which this type belongs), which one of a number of alternative third steps 23a, 23b, 23c is executed. Only one of these alternative third steps 23a is shown in more detail.

The third steps 23a,b,c make use of resolution result memory 18. In a first sub-step 230 of the third step 23, the interpreter 12 takes the constant pool reference contained in the virtual machine instruction that is being interpreted and searches one of the sub-memories 180, 182, 184, 186 to determine whether a result of resolving the constant pool reference is stored in that sub-memory 180, 182, 184, 186. The interpreter 12 selects the sub-memory 180, 182, 184, 186 dependent on the type (category) of virtual machine instruction that is being interpreted. For example, in case of a "getfield" or "putfield" instruction, which belong to the same category, a first one 180 of the sub-memories is searched and in case of a "new" instruction a second one 182 of the sub-memories is searched.

In a second sub-step 232 the interpreter 12 determines the further course of action dependent on whether or not a resolution result was found in the first sub-step 230. If a resolution result was found, the interpreter 12 immediately executes a fourth sub-step 234 which causes the processor 10 to execute one or more native instructions that implement the virtual machine instruction that is being executed. During execution by the processor 10 the result of resolution is fed to the processor 10 as an operand. It should be noted that the resolution result can be made up of a set of numbers, for example an address of a variable and a length code describing the number of words that make up the variable.

If no resolution result is found in second sub-step 232, the interpreter 12 executes fifth and sixth substeps 235, 236. In fifth substep 235 the interpreter 12 resolves the constant pool reference by loading information from the object referred to by the reference from data memory 16, and if necessary by loading data referred to by that information and so on. Eventually, this results in a resolution result that can be used in the fourth substep 234. In the sixth substep 236 the interpreter 12 selects one of the sub-memories 180, 182, 184, 186 dependent on the type of the instruction that is being interpreted and the interpreter 12 stores the resolution result in that selected sub-memory 180, 182, 184, 186 in combination with the constant pool reference from the instruction. Subsequently, interpreter 12 proceeds with the fourth sub-step 234 as in the case when the resolution result was retrieved from the sub-memory 180, 182, 184, 186.

After completion of the fourth substep 234, the third step 23a is complete and the interpreter 12 steps to the next virtual machine instruction in a fourth step 24 of the flowchart. After that the interpreter 12 repeats the process from the first step 21.

The alternatives 23a, 23b, 23c for the third step of the flow-chart all have similar structure, but each uses a different one of the submemories 180, 182, 184, 186 of the resolution result memory 18, so that the submemories 180, 182, 184, 186 are used for different categories of instructions. In general, the type of resolution result produced by the equivalents of fifth substep 235 in the alternatives 23a, 23b, 23c of the third step will also be different in different alternative steps 23a, 23b, 23c. Preferably, the resolution result is worked out in the fifth substep 235 to the point of execution of a virtual machine instruction where the result is the same for all executions of the virtual machine instructions of the type for which the alternative step 23a, 23b, 23c is allocated. This worked out result is stored in the sub-memory 180, 182, 184, 186 in the sixth substep 236. However, without deviating from the invention, a result may be stored in the sub-memory 180, 182, 184, 186 for example to save memory space. In this case some of the working out of the result is moved to the fourth substep 234.

In the sub-memories 180, 182, 184, 186 the resolution result may be stored in combination with the constant pool reference in various ways. Basically, each sub-memory 180, 182, 184, 186 must perform an associative memory function, allowing the retrieval of a resolution result on the basis of a constant pool reference.

This may be realized in many ways that are known per se. In one embodiment a binary search tree structure is used. In this embodiment one uses pairs of a constant pool reference and a resolution result. Each pair is assigned for example to a node or leaf in the tree structure. Preferably, the tree is structured so that two approximately equal sized sub-trees are appended to every node. The sub-trees appended to any particular node end in leaves with constant pool references that are bigger and not bigger than a threshold value for the particular node for one sub-tree and the other respectively. Typically the threshold value is one of the constant pool references that is actually used.

Thus, a required constant pool reference can be searched for by starting at a root node of the tree, comparing the reference with the threshold of the node and selecting the sub-tree of that node that may contain the reference on the basis of that comparison and so on until one arrives at a leaf node. A tree structure is implemented for example by representing each node with a stored data-structure that contains the threshold and pointers to the data-structures of further nodes that form the roots of the subtrees appended to the node. It will be noted that in this case memory locations from submemories 180, 182, 184, 186 are distinguished only by storing (constant pool reference resolution, result) pairs belonging to different trees, and may occur interspersed with memory locations from other trees. Of course, to speed up searching a pair may also be associated with a node of a tree, the constant pool reference of the pair serving as threshold for the node.

In principle, a respective sub-memory 180, 182, 184, 186 and alternative third step 23a–c may be provided for every possible virtual machine instruction from the instruction set which uses an object-reference. In the case of JAVA virtual machine instructions a respective sub-memory 180, 182, 184, 186 and alternative third step 23a–c may be provided for the anewarray, checkcast, getfield, getstatic, instanceof, invokeinterface, invokespecial, invokestatic, invokevirtual, ldc, ldc_w, ldc2_w, multianewarray, new, putfield, pustatic instructions. However, instructions from some groups of these virtual machine instructions, such as a group containing putfield and getfield, require identical constant pool resolution. Also, the same constant pool reference may be used in instances of all of the instructions from the same group. Therefore a common sub-memory 180, 182, 184, 186 and alternative third step 23a–c is preferably provided for such a group. The distinction between the different instructions in the group is made only in the fourth sub-step 234.

Other instructions from the instruction set that may be placed in such a group are a particular JAVA virtual machine instruction and its "quick" variants. JAVA has for example the following quick variants: ldc_quick, ldc w_quick, ldc2_w_quick, getfield_quick, putfield_quick, getfield2_quick, putfield2_quick, getstatic_quick, putstatic_quick, getstatic2_quick, putstatic2_quick, invokevirtual quick, invokenonvirtual_quick, invokesuper_quick, invokestatic_quick, invokeinterface_quick, invokevirtualobject_quick, new_quick, anewarray_quick, multianewarray_quick, checkcast_quick, instanceof_quick, invokevirtual_quick w, getfield_quick_w, putfield_quick_w.

Quick variants can also use resolved data as operand(s). In this case, execution of a quick variant does not require resolution or search for a reference that has already been resolved. For such quick variants, therefore, no search is executed. Preferably, once the object reference of an instruction has been resolved this instruction is replaced in memory by its quick variant with the result of resolution as operand (of course this is only possible if the program memory is not a ROM). In addition the result of resolution is stored in one of the sub-memories. Thus, if the instruction from a certain memory location is executed again it will be executed as a quick variant without consulting the sub-memory, but if the same type of instruction with the same operand from a different memory location, the result of resolution from the sub-memory is used as operand.

In some cases some instructions from a group of such instructions may need more information about the resolution in result than other instructions from the group. Preferably, the maximum amount of information needed for any member of the group is stored in the sub-memory 180, 182, 184, 186, irrespective of whether all of this information is used for the particular instruction for which resolution was performed. Thus all members of the group can use the resolution result from the sub-memory 180, 182, 184, 186.

Without deviating from the invention the interpreter 12 may use a step common for all instructions to search for the resolution result from the resolution result memory 18, using the instruction type as an index to select a particular sub-memory 180, 182, 184, 186.

In principle all resolution results produced during execution of the program may be kept in resolution result memory 18 once they have been found until completion of the program, or until completion of a program section to which these results are local. In case it is desirable to reduce memory usage it may be considered to replace a resolution result for one constant pool reference by another resolution result for a different constant pool reference, for example replacing the least recently used resolution result. This may mean that the replaced result may have to be resolved again, but it reduces the amount of needed resolution result memory, or at least it may provide a guaranteed maximum memory use.

What is claimed is:

1. A method of executing a program with a computer system that supports mutually different categories of instruction types, the program containing a particular instruction with a particular symbolic reference to operand data, the method comprising providing a symbol table containing information for resolving symbolic references in instructions from any of the categories;

providing groups of memory locations, each group being assigned to a respective one of the categories of instructions, each group for storing symbolic reference-result associations, the result of the association having resulted from resolving the symbolic reference of the association for an instruction of the category of instructions to which the group is assigned;

executing the particular instruction, said executing comprising consulting the group assigned to the category to which the particular instruction belongs, to determine whether that group contains an association for the particular symbolic reference and, if there is such an association, using the result from the association as operand data for executing the particular instruction and, if there is no such association, resolving the particular symbolic reference by means of the symbol table, using the result from said resolving as the operand data for executing the particular instruction and storing an association between the symbolic reference and the result of said resolving in the group assigned to the category of the particular instruction.

2. A method according to claim 1, the computer system having an instruction set that contains a first and second instruction type that both belong to a first one of the respective categories of instructions, the first and second instruction requiring symbolic references of a common type, which is different from a type of symbolic reference required by a further instruction from the instruction set, the further instruction belonging to a further one of the respective categories of instructions.

3. A method according to claim 1, each result in the associations for at least one of the groups comprising a data size indicator and information identifying an operand value.

4. A method according to claim 1, the computer system comprising a processor with a native instruction set, the categories of instructions belonging to a virtual machine instruction set, the method comprising translating each virtual machine instruction from the program into one or more translated native instructions and causing the processor to execute the translated native machine instructions with operand data derived from the result.

5. A method according to claim 1, wherein instructions are executed according to a sequence in which they are stored in a program memory, the method comprising loading the particular instruction from a particular program memory location for said executing and replacing the particular instruction in the particular program memory location by an equivalent instruction having the result as operand, whereby the equivalent instruction is executed instead of the particular instruction when the particular program memory location is used again during execution of the program.

6. A computer program product comprising an interpreter program for causing a processor to execute native instructions translated from virtual machine instructions that contain symbolic references, the virtual machine instructions belonging to mutually different categories of virtual machine instructions, the interpreter program being arranged to cause the processor to provide a symbol table containing information for resolving symbolic references in virtual machine instructions from any of the categories;

provide groups of memory locations, each group being assigned to a respective one of the categories, each group for storing symbolic reference-result associations, the result of the association having resulted from resolving the symbolic reference of the association for a virtual machine instruction of the category to which the group is assigned;

execute a particular virtual machine instruction comprising a particular symbolic reference, said executing comprising consulting the group assigned to the category to which the particular virtual machine instruction belongs, to determine whether that group contains an association for the particular symbolic reference and, if there is such an association, using the result from the association to provide operand data for executing native instructions and, if there is no such association, resolving the particular symbolic reference by means of the symbol table, using the result from said resolving to provide the operand data for executing the native instructions and storing an association between the symbolic reference and the result of said resolving in the group assigned to the category of the particular instruction.

7. A computer program product according to claim 6, the virtual machine instructions belonging to a virtual machine instruction set that contains a first and second virtual machine instruction that both belong to a first one of the respective categories, the first and second virtual machine instruction requiring symbolic references of a common type, which is different from a type of symbolic reference required by a further virtual machine instruction from the virtual instruction set, the further instruction belonging to a further one of the respective categories.

8. A data processing device for executing mutually different categories of instructions, the device comprising a first storage space for a symbol table containing information for resolving symbolic references in instructions from any of the categories;

a plurality of respective second storage spaces, each respective second storage space being assigned to a respective one of the categories of instructions, each respective second storage space for storing symbolic reference-result associations, the result of the association having resulted from resolving that symbolic reference for an instruction of the category of instructions to which the respective second storage space is assigned;

an execution unit arranged to consult, when executing a particular instruction containing a particular symbolic reference, the respective second storage space assigned to the category to which the particular instruction belongs, to determine whether that respective second storage space contains an association for the particular symbolic reference and, if there is such an association, using the result from the association to provide operand data for executing the particular instruction and, if there is no such association, resolving the particular symbolic reference by means of the symbol table, using the result from said resolving to provide the operand data for executing the particular instruction and storing an association between the symbolic reference and the result of said resolving in the respective second storage space assigned to the category of the particular instruction.

9. A device according to claim 8, the device having an instruction set that contains a first and second instruction that both belong to a first one of the respective categories of instructions, the first and second instruction requiring symbolic references of a common type, which is different from a type of symbolic reference required by a further instruction from the instruction set, the further instruction belonging to a further one of the respective categories of instructions.

* * * * *